United States Patent
Allen et al.

(10) Patent No.: US 9,965,641 B2
(45) Date of Patent: *May 8, 2018

(54) POLICY-BASED DATA-CENTRIC ACCESS CONTROL IN A SORTED, DISTRIBUTED KEY-VALUE DATA STORE

(71) Applicant: Sqrrl Data, Inc., Cambridge, MA (US)

(72) Inventors: Michael R. Allen, Watertown, MA (US); John W. Vines, Cambridge, MA (US); Adam P. Fuchs, Arlington, MA (US)

(73) Assignee: A9.com, Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/570,067

(22) Filed: Dec. 15, 2014

(65) Prior Publication Data

US 2015/0294120 A1    Oct. 15, 2015

Related U.S. Application Data

(63) Continuation of application No. 14/250,177, filed on Apr. 10, 2014, now Pat. No. 8,914,323.

(51) Int. Cl.
*G06F 17/30* (2006.01)
*G06F 21/62* (2013.01)

(52) U.S. Cl.
CPC .... *G06F 21/6218* (2013.01); *G06F 17/30389* (2013.01); *G06F 17/30424* (2013.01); *G06F 21/6227* (2013.01); *G06F 2221/2145* (2013.01)

(58) Field of Classification Search
CPC ......... G06F 21/6227; G06F 2221/2145; G06F 17/30289; G06F 17/30333;

(Continued)

(56) References Cited

U.S. PATENT DOCUMENTS 6,671,696 B1 * 12/2003 Holcombe .............. G06F 17/24
7,779,247 B2 * 8/2010 Roegner ............. G06F 21/6218
713/155

(Continued)

OTHER PUBLICATIONS

Hu et al, "Guide to Attribute Based Access Control (ABAC) Definition and Considerations," NIST Special Publication 800-162, Jan. 2014.

(Continued)

*Primary Examiner* — Sheree Brown
(74) *Attorney, Agent, or Firm* — Nicholson De Vos Webster & Elliott LLP

(57) ABSTRACT

A method, apparatus and computer program product for policy-based access control in association with a sorted, distributed key-value data store in which keys comprise n-tuple structure that includes a cell-level access control. In this approach, an information security policy is used to create a set of pluggable policies. A pluggable policy may be used during data ingest time, when data is being ingested into the data store, and a pluggable policy may be used during query time, when a query to the data store is received for processing against data stored therein. Generally, a pluggable policy associates one or more user-centric attributes (or some function thereof), to a particular data-centric label. By using pluggable policies, preferably at both ingest time and query time, the data store is enhanced to provide a seamless and secure policy-based access control mechanism in association with the cell-level access control enabled by the data store.

9 Claims, 8 Drawing Sheets

(58) Field of Classification Search
CPC ......... G06F 17/30442; G06F 17/30477; G06F 17/30867; G06F 17/30902
USPC ........................................................ 707/623
See application file for complete search history.

(56) References Cited

U.S. PATENT DOCUMENTS

| | | | |
|---|---|---|---|
| 8,447,754 B2* | 5/2013 | Weissman | G06F 17/30389 707/713 |
| 8,560,836 B2 | 10/2013 | Roegner | |
| 9,092,502 B1* | 7/2015 | Cannaliato | G06F 17/30595 |
| 9,507,822 B2* | 11/2016 | Weissman | G06F 17/30389 |
| 2009/0320005 A1* | 12/2009 | Toub | G06F 8/45 717/149 |
| 2011/0231889 A1* | 9/2011 | Dheap | G06F 17/30389 726/1 |
| 2011/0258178 A1* | 10/2011 | Eidson | G06F 17/30389 707/714 |
| 2011/0258179 A1* | 10/2011 | Weissman | G06F 17/30389 707/714 |
| 2013/0238595 A1* | 9/2013 | Weissman | G06F 17/30389 707/713 |
| 2013/0339366 A1* | 12/2013 | Khimich | G06F 17/30587 707/741 |
| 2014/0081918 A1* | 3/2014 | Srivas | G06F 17/3007 707/639 |

OTHER PUBLICATIONS

Chang et al, "Bigtable: A Distributed Storage System for Structured Data," OSDI, 2006.
Fuchs, "Accumulo Extensions to Google's Bigtable Design," National Security Agency Computer and Information Sciences Research Group, Mar. 2012.

* cited by examiner

POLICY-BASED DATA-CENTRIC ACCESS CONTROL IN A SORTED, DISTRIBUTED KEY-VALUE DATA STORE

BACKGROUND

Technical Field

This application relates generally to secure, large-scale data storage and, in particular, to database systems providing fine-grained access control.

Brief Description of the Related Art

"Big Data" is the term used for a collection of data sets so large and complex that it becomes difficult to process (e.g., capture, store, search, transfer, analyze, visualize, etc.) using on-hand database management tools or traditional data processing applications. Such data sets, typically on the order of terabytes and petabytes, are generated by many different types of processes.

Big Data has received a great amount of attention over the last few years. Much of the promise of Big Data can be summarized by what is often referred to as the five V's: volume, variety, velocity, value and veracity. Volume refers to processing petabytes of data with low administrative overhead and complexity. Variety refers to leveraging flexible schemas to handle unstructured and semi-structured data in addition to structured data. Velocity refers to conducting real-time analytics and ingesting streaming data feeds in addition to batch processing. Value refers to using commodity hardware instead of expensive specialized appliances. Veracity refers to leveraging data from a variety of domains, some of which may have unknown provenance. Apache Hadoop™ is a widely-adopted Big Data solution that enables users to take advantage of these characteristics. The Apache Hadoop framework allows for the distributed processing of Big Data across clusters of computers using simple programming models. It is designed to scale up from single servers to thousands of machines, each offering local computation and storage. The Hadoop Distributed File System (HDFS) is a module within the larger Hadoop project and provides high-throughput access to application data. HDFS has become a mainstream solution for thousands of organizations that use it as a warehouse for very large amounts of unstructured and semi-structured data.

In 2008, when the National Security Agency (NSA) began searching for an operational data store that could meet its growing data challenges, it designed and built a database solution on top of HDFS that could address these needs. That solution, known as Accumulo, is a sorted, distributed key/value store largely based on Google's Bigtable design. In 2011, NSA open sourced Accumulo, and it became an Apache Foundation project in 2012. Apache Accumulo is within a category of databases referred to as NoSQL databases, which are distinguished by their flexible schemas that accommodate semi-structured and unstructured data. They are distributed to scale well horizontally, and they are not constrained by the data organization implicit in the SQL query language. Compared to other NoSQL databases, Apache Accumulo has several advantages. It provides fine-grained security controls, or the ability to tag data with security labels at an atomic cell level. This feature enables users to ingest data with diverse security requirements into a single platform. It also simplifies application development by pushing security down to the data-level. Accumulo has a proven ability to scale in a stable manner to tens of petabytes and thousands of nodes on a single instance of the software. It also provides a server-side mechanism (Iterators) that provide flexibility to conduct a wide variety of different types of analytical functions. Accumulo can easily adapt to a wide variety of different data types, use cases, and query types. While organizations are storing Big Data in HDFS, and while great strides have been made to make that data searchable, many of these organizations are still struggling to build secure, real-time applications on top of Big Data. Today, numerous Federal agencies and companies use Accumulo.

While technologies such as Accumulo provide scalable and reliable mechanisms for storing and querying Big Data, there remains a need to provide enhanced enterprise-based solutions that seamlessly but securely integrate with existing enterprise authentication and authorization systems, and that enable the enforcement of internal information security policies during database access.

This disclosure addresses this need.

BRIEF SUMMARY

This disclosure describes a method for policy-based access control in association with a sorted, distributed key-value data store in which keys comprise an n-tuple structure that includes a key-value access control. A representative data store is Accumulo. In this approach, an information security policy is used to create a set of pluggable policies, each of which may include one or more policy rules. A pluggable policy may be used during data ingest time, when data is being ingested into the data store, and a pluggable policy may be used during query time, when a query to the data store is received for processing against data stored therein. Generally, a pluggable policy associates one or more user-centric attributes (or some function thereof), to a particular data-centric label. By using pluggable policies, preferably at both ingest time and query time, the data store is enhanced to provide a seamless and secure policy-based access control mechanism in association with the cell-level access control enabled by the data store.

In one embodiment, a method of access control operates in association with the data store. As data is ingested into the data store, one or more key-value pairs in the data are tagged with a data-centric label as determined by an information policy to generate a tagged representation of the data. The tagged data is then stored in the data store. Then, at query time, and in response to receipt of a query from a querier, typically a set of operations is carried out (assuming the query is to be evaluated). First, the query is processed according to an information policy to identify a set of one or more data-centric labels to allow the query to use. Preferably, the processing evaluates values of one or more user-centric attributes associated with the querier against at least one rule in the information policy to identify the set of one or more data-centric labels. Preferably, the values of the one or more user-centric attributes are retrieved from one or more user-attribute data sources as defined in the rule. Based on the processing step, the query is then forwarded to the data store with the set of one more identified data-centric labels. A response to the query is then received. The response is generated in the data store in a known manner by evaluating the set of one or more data-centric labels in the query with at least one data-centric access control in the data store. The response to the query is then returned to the querier to complete the query-time processing.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
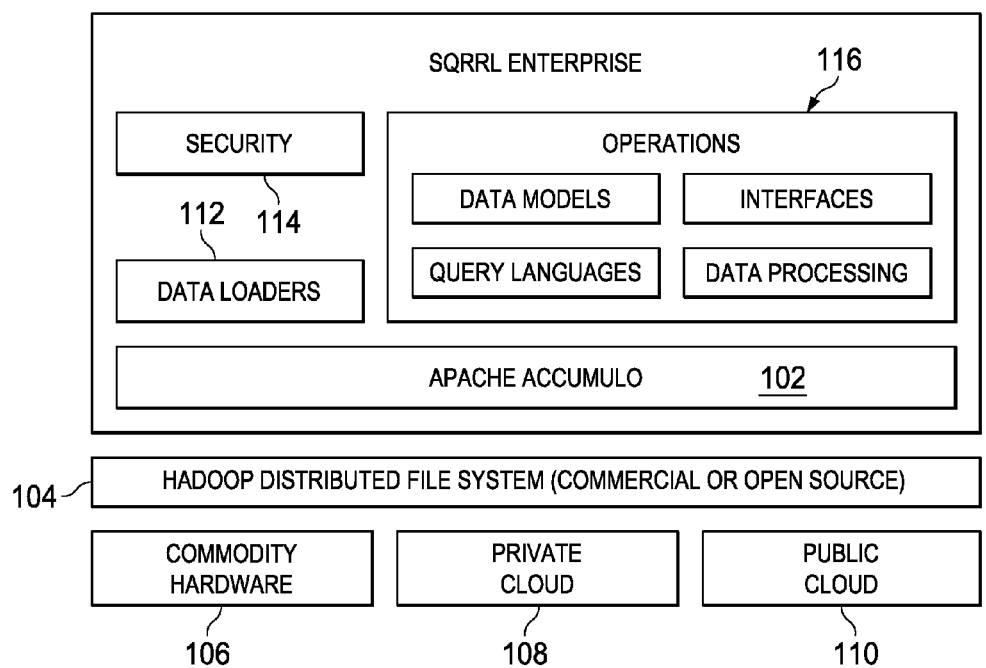
FIG. 1 depicts the technology architecture for an enterprise-based NoSQL database system according to this disclosure.

FIG. 1 represents the technology architecture for an enterprise-based database system of this disclosure. As will be described, the system 100 of this disclosure preferably comprises a set of components that sit on top of a NoSQL database, preferably Apache Accumulo 102. The system 100 (together with Accumulo) overlays a distributed file system 104, such as Hadoop Distributed File System (HDFS), which in turn executes in one or more distributed computing environments, illustrated by commodity hardware 106, private cloud 108 and public cloud 110. Sgrrl™ is a trademark of Sqrrl Data, Inc., the assignee of this application. Generalizing, the bottom layer typically is implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). A cloud platform may comprise co-located hardware and software resources, or resources that are physically, logically, virtually and/or geographically distinct. Communication networks used to communicate to and from the platform services may be packet-based, non-packet based, and secure or non-secure, or some combination thereof.

Referring back to FIG. 1, the system components comprise a data loader component 112, a security component 114, and an analytics component 116. Generally, the data loader component 112 provides integration with a data ingest service, such as Apache Flume, to enable the system to ingest streaming data feeds, such as log files. The data loader 112 can also bulk load JSON, CSV, and other file formats. The security component 114 provides data-centric security at the cell-level (i.e., each individual key/value pair is tagged with a security level). As will be described in more detail below, the security component 114 provides a labeling engine that automates the tagging of key/value pairs with security labels, preferably using policy-based heuristics that are derived from an organization's existing information security policies, and that are loaded into the labeling engine to apply security labels at ingest time. The security component 114 also provides a policy engine that enables both role-based and attribute-based access controls. As will also be described, the policy engine in the security component 114 allows the organization to transform identity and environmental attributes into policy rules that dictate who can access certain types of data. The security component 114 also integrates with enterprise authentication and authorization systems, such as Active Directory, LDAP and the like. The analytics component 116 enables the organization to build a variety of analytical applications and to plug existing applications and tools into the system. The analytics component 116 preferably supports a variety of query languages (e.g., Lucene, custom SQL, and the like), as well as a variety of data models that enable the storage of data as key/value pairs (native Accumulo data format), as graph data, and as JavaScript Object Notation (JSON) data. The analytics component 116 also provides an application programming interface (API), e.g., through Apache Thrift. The component 116 also provides real-time processing capabilities powered by iterators (Accumulo's native server-side mechanism), and an extensible indexing framework that indexes data upon.

Figure 2:
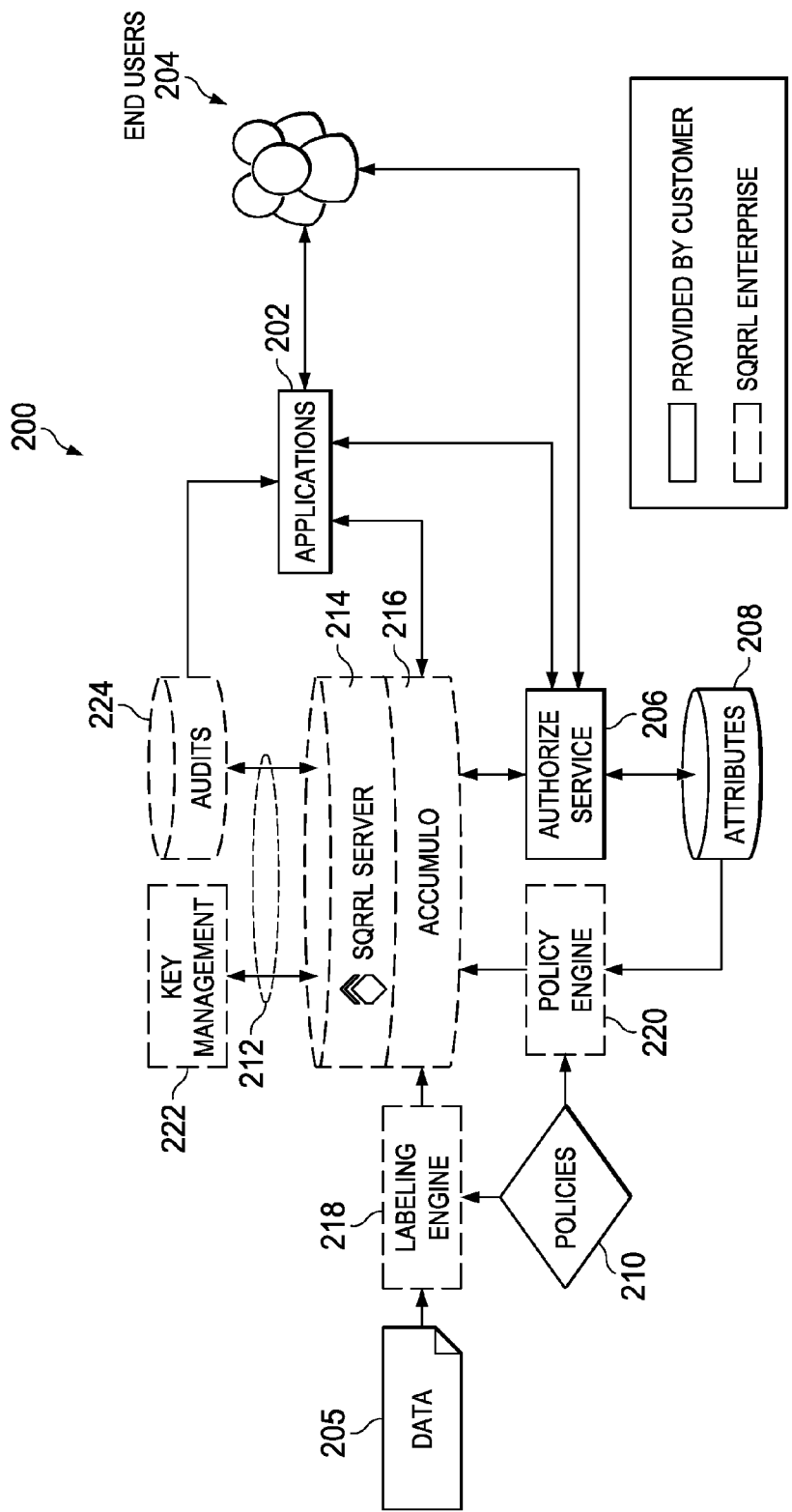
FIG. 2 depicts the architecture in FIG. 1 in an enterprise to provide identity and access management integration according to this disclosure.

FIG. 2 depicts the architecture in FIG. 1 integrated in an enterprise to provide identity and access management according to an embodiment of this disclosure. In this embodiment, it is assumed that the enterprise 200 provides one or more operational applications 202 to enterprise end users 204. An enterprise service 206 (e.g., Active Directory, LDAP, or the like) provides identity-based authentication and/or authorization in a known manner with respect to end user attributes 208 stored in attributed database. The enterprise has a set of information security policies 210. To provide identity and access management integration, the system 212 comprises server 214 and NoSQL database 216, labeling engine 218, and policy engine 220. The system may also include a key management module 222, and an audit sub-system 224 for logging. The NoSQL database 216, preferably Apache Accumulo, comprises an internal architecture (not shown) comprising tablets, tablet servers, and other mechanisms. The reader's familiarity with Apache Accumulo is presumed. As is well-known, tablets provide partitions of tables, where tables consist of collections of sorted key-value pairs. Tablet servers manage the tablets and, in particular, by receiving writes from clients, persisting writes to a write-ahead log, sorting new key-value pairs in memory, periodically flushing sorted key-value pairs to new files in HDFS, and responding to reads from clients. During a read, a tablet server provides a merge-sorted view of all keys and values from the files it created and the sorted in-memory store. The tablet mechanism in Accumulo simultaneously optimizes for low latency between random writes and sorted reads (real-time query support) and efficient use of disk-based storage. This optimization is accomplished through a mechanism in which data is first buffered and sorted in memory and later flushed and merged through a series of background compaction operations. Within each tablet a server-side programming framework (called the Iterator Framework) provides user-defined programs (Iterators) that are placed in different stages of the database pipeline, and that allow users to modify data as it flows through Accumulo. Iterators can be used to drive a number of real-time operations, such as filtering, counts and aggregations.

The Accumulo database provides a sorted, distributed key-value data store in which keys comprises a five (5)-tuple structure: row (controls atomicity), column family (controls locality), column qualifier (controls uniqueness), visibility label (controls access), and timestamp (controls versioning). Values associated with the keys can be text, numbers, images, video, or audio files. Visibility labels are generated by translating an organization's existing data security and information sharing policies into Boolean expressions over data attributes. In Accumulo, a key-value pair may have its own security label that is stored under the column visibility element of the key and that, when present, is used to determine whether a given user meets security requirements to read the value. This cell-level security approach enables data of various security levels to be stored within the same row and users of varying degrees of access to query the same table, while preserving data confidentiality. Typically, these labels consist of a set of user-defined labels that are required to read the value the label is associated with. The set of labels required can be specified using syntax that supports logical combinations and nesting. When clients attempt to read data, any security labels present in a cell are examined against a set of authorizations passed by the client code and vetted by the security framework. Interaction with Accumulo may take place through a query layer that is implemented via a Java API. A typical query layer is provided as a web service (e.g., using Apache Tomcat).

Referring back to FIG. 2, and according to this disclosure, the labeling engine 218 automates the tagging of key-value pairs with security labels, e.g., using policy-based heuristics. As will be described in more detail below, these labeling heuristics preferably are derived from an organization's existing information security policies 210, and they are loaded into the labeling engine 218 to apply security labels, preferably at the time of ingest of the data 205. For example, a labeling heuristic could require that any piece of data in the format of "xxx-xx-xxxx" receive a specific type of security label (e.g., "ssn"). The policy engine 220, as will be described in more detail below as well, provides both role-based and attribute-based access controls. The policy engine 220 enables the enterprise to transform identity and environmental attributes into policy rules that dictate who can access certain types of data. For example, the policy engine could support a rule that data tagged with a certain data-centric label can only be accessed by current employees during the hours of 9-5 and who are located within the United States. Another rule could support a rule that only employees who work for HR and who have passed a sensitivity training class can access certain data. Of course, the nature and details of the rule(s) are not a limitation.

The process for applying these security labels to the data and connecting the labels to a user's designated authorizations is now described. The first step is gathering the organization's information security policies and dissecting them into data-centric and user-centric components. As data 205 is ingested, the labeling engine 218 tags individual key-value pairs with data-centric visibility labels that are preferably based on these policies. Data is then stored in the database 216, where it is available for real-time queries by the operational application(s) 202. End users 204 are authenticated and authorized to access underlying data based on their defined attributes. For example, as an end user 204 performs an operation (e.g., performs a search) via the application 202, the security label on each candidate key-value pair is checked against the set of one or more data-centric labels derived from the user-centric attributes 208, and only the data that he or she is authorized to see is returned.

Figure 3:
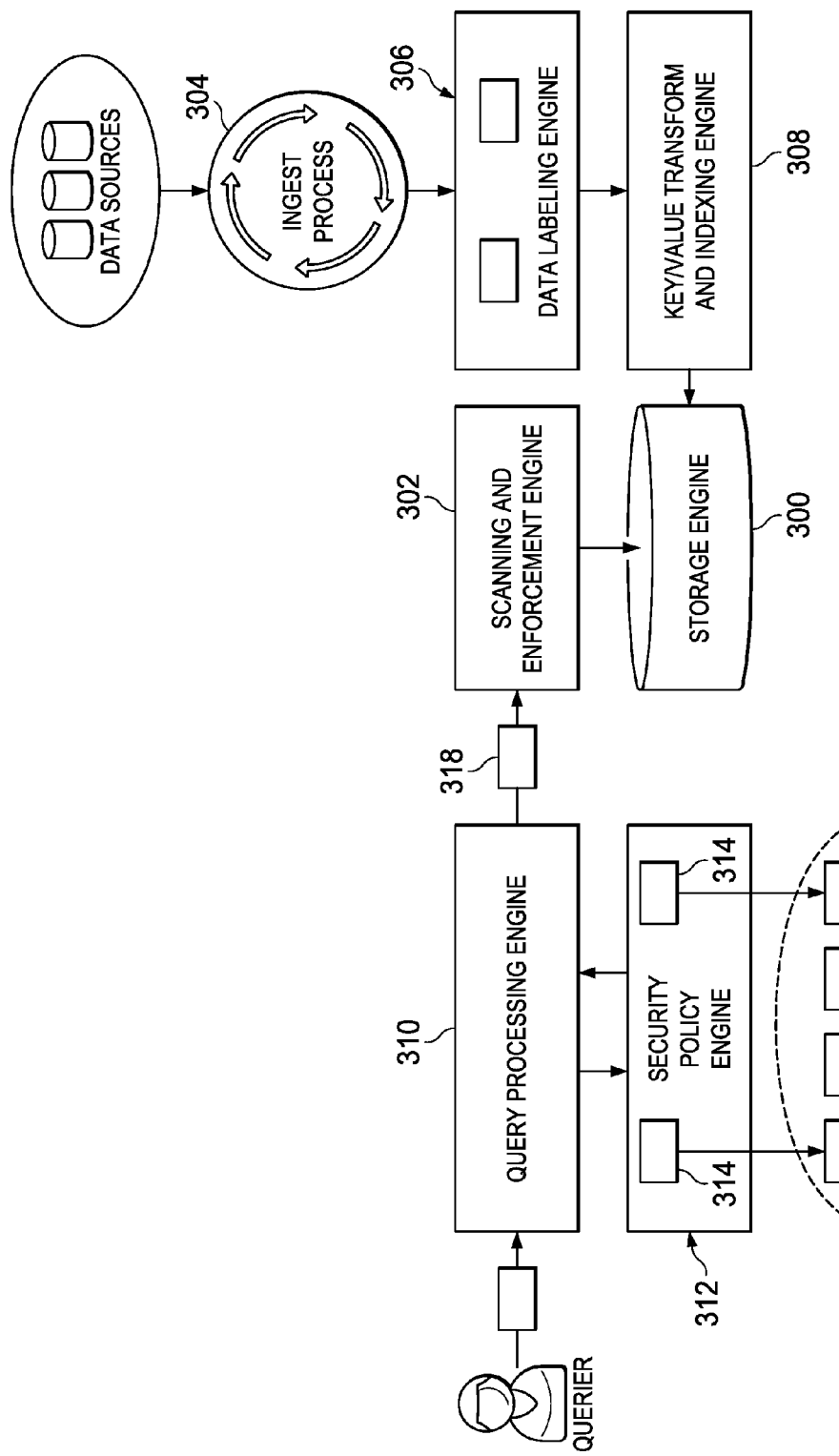
FIG. 3 depicts the main components of the solution shown in FIG. 2.

FIG. 3 depicts the main components of the solution shown in FIG. 2. As illustrated, the NoSQL database (located in the center) comprises a storage engine 300, and a scanning and enforcement engine 302. In this depiction, the ingest operations are located on the right side and comprise ingest process 304, data labeling engine 306, and a key-value transform and indexing engine 308. The left portion of the diagram shows the query layer, which comprises a query processing engine 310 and the security policy engine 312. The query processing engine 310 is implemented in the server in FIG. 2. As described above, as data is ingested into the server, individual key-value pairs are tagged with a data-centric access control and, in particular, a data-centric visibility label preferably based on or derived from a security policy. These key-value pairs are then stored in physical storage in a known manner by the storage engine 300.

At query time, and in response to receipt of a query from a querier, the query processing engine 310 calls out to the security policy engine 312 to determine an appropriate set of data-centric labels to allow the query to use if the query is to be passed onto the Accumulo database for actual evaluation. The query received by the query processing engine may include a set of one or more data-centric labels specified by the querier, or the query may not have specified data-centric labels associated therewith. Typically, the query originates from a human at a shell command prompt, or it may represent one or more actions of a human conveyed by an application on the human's behalf. Thus, as used herein, a querier is a user, an application associated with a user, or some program or process. According to this disclosure, the security policy engine 312 supports one or more pluggable policies 314 that are generated from information security policies in the organization. When the query processing engine 310 receives the query (with or without the data-centric labels), it calls out to the security policy engine to obtain an appropriate set of data-centric labels to include with the query (assuming it will be passed), based on these one or more policies 314. As further illustrated in FIG. 3, during this call-out process, the security policy engine 312 in turn may consult with any number of sources 316 for values of user-centric attributes about the user, based on the one or more pluggable policies 312 supported by the security policy engine. If the query is permitted (by the query processing engine) to proceed, the query 318 (together with the one or more data-centric labels) then is provided by the query processing engine 310 to the scanning and enforcement engine 302 in the NoSQL database. The scanning and enforcement engine 302 then evaluates the set of one or more data-centric labels in the query against one or more data-centric access controls (the visibility labels) to determine whether read access to a particular piece of information in the database is permitted. This key-value access mechanism (provided by the scanning and enforcement engine 302) is a conventional operation.

Figure 4:
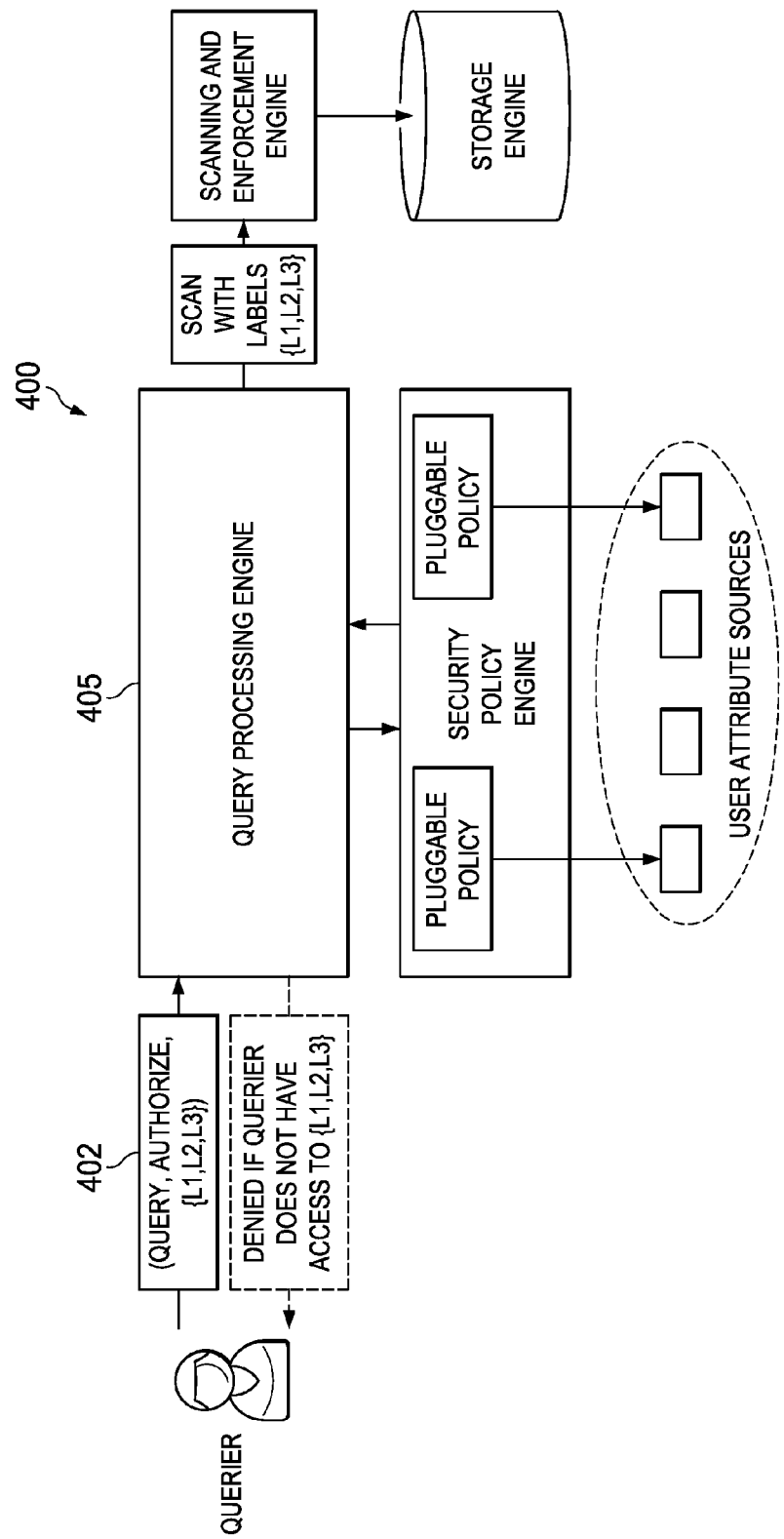
FIG. 4 illustrates a first use case wherein a query includes specified data-centric labels.
Figure 5:
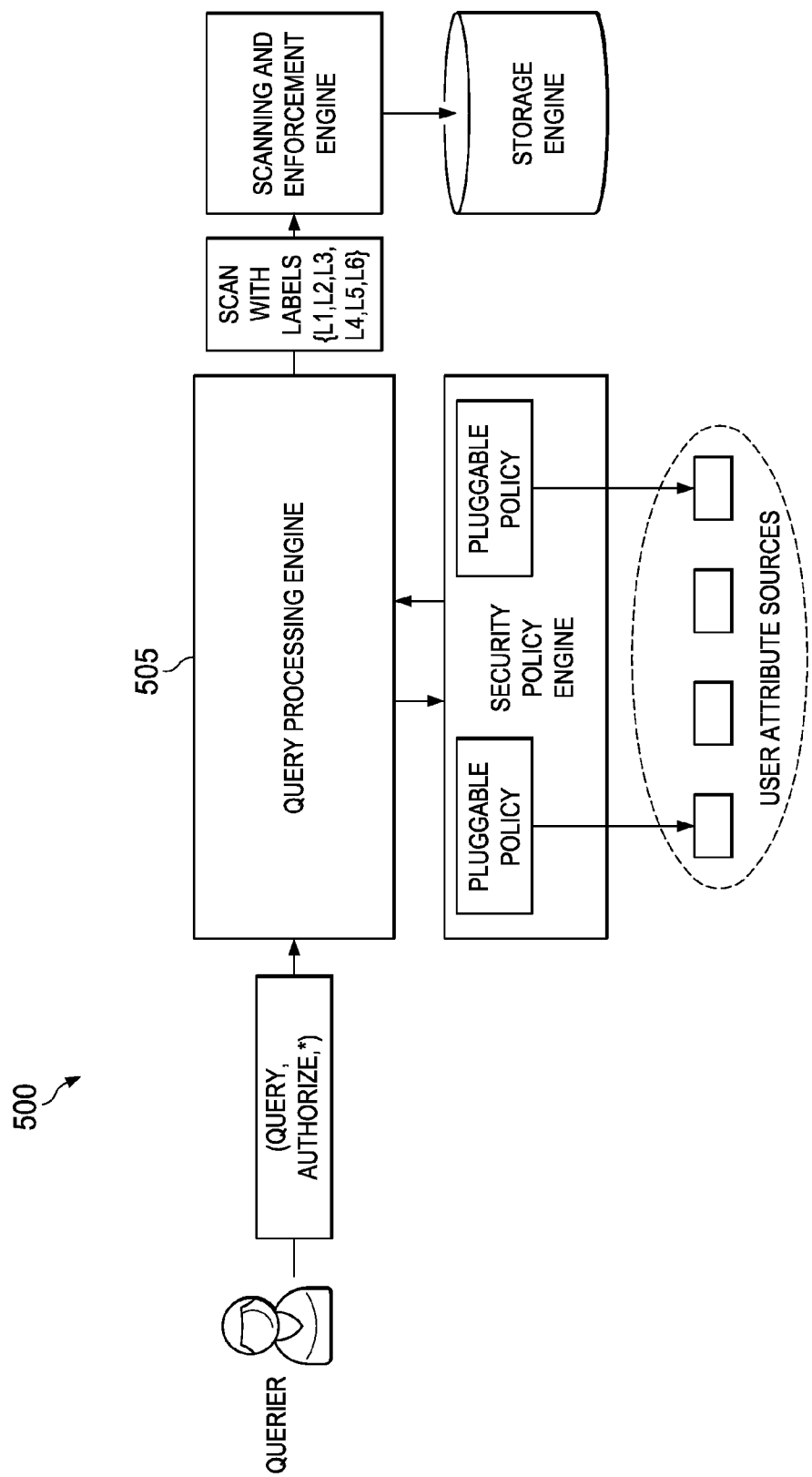
FIG. 5 illustrates a second use wherein a query does not include specified data-centric labels.

The query processing engine typically operates in one of two use modes. In one use case, shown in FIG. 4, the query 400 (received by the query processing engine) includes one or more specified data-centric labels 402 that the querier would like to use (in this example, L1-L3). Based on the configured policy or policies, the query processing engine 405 determines that the query may proceed with this set (or perhaps some narrower set) of data-centric labels, and thus the query is passed to the scanning and processing engine as shown. In the alternative, and as indicated by the dotted portion, the query processing engine 405 may simply reject the query operation entirely, e.g., if the querier is requesting more access than they would otherwise properly be granted by the configured policy or policy. FIG. 5 illustrates a second use case, wherein the query 500 does not included any specified data-centric labels. In this example, once again the query processing engine 505 calls out to the security policy engine, which in turn evaluates the one or more configured policies to return the appropriate set of data-centric labels. In this scenario, in effect the querier is stating it wants all of his or her entitled data-centric labels (e.g., labels L1-L6) to be applied to the query; if this is permitted, the query includes these labels and is once again passed to the scanning and processing engine.

Figure 6:
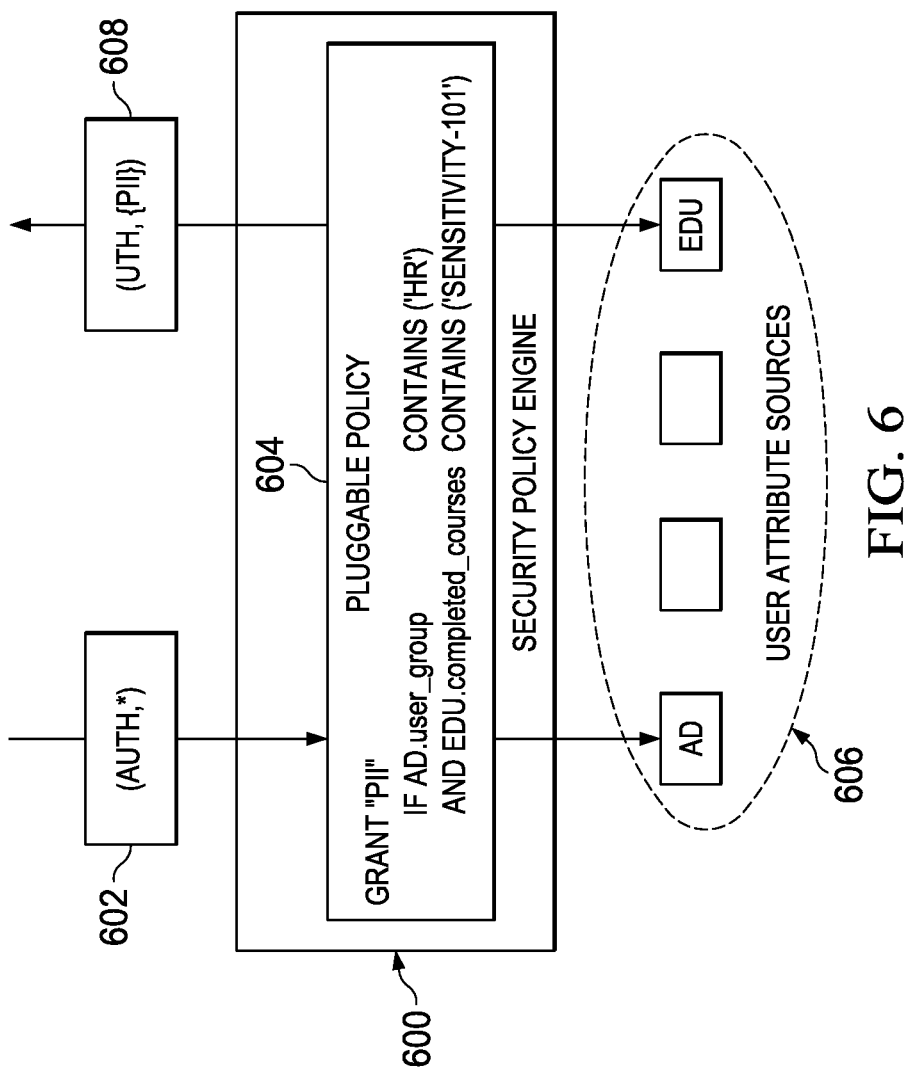
FIG. 6 illustrates a basic operation of the security policy engine.

FIG. 6 illustrates the basic operation of the security policy engine. In this example, the query 602 does not specify any data-centric labels. The security policy engine 600 includes at least one pluggable security policy 604 that is configured or defined, as will be explained in more detail below. In general, a pluggable policy takes, as input, user-centric attributes (associated with a user-centric realm), and applies one or more policy rules to generate an output in the form of one or more data-centric attributes (associated with a data-centric realm). As noted above, this translation of user-centric attribute(s) to data-centric label(s) may involve the security policy engine checking values of one or more user attribute sources 606. Generalizing, a "user-centric" attribute typically corresponds to a characteristic of a subject, namely, the entity that is requesting to perform an operation on an object. Typical user-centric attributes are such attributes as name, data of birth, home address, training record, job function, etc. An attribute refers to any single token. "Data-centric" attributes are associated with a data element (typically, a cell, or collection of cells). A "label" is an expression of one or more data-centric attributes that is used to tag a cell.

In FIG. 6, the pluggable policy 604 enforces a rule that grants access to the data-centric label "PII" if two conditions are met for a given user: (1) the user's Active Directory (AD) group is specified as "HR" (Human Resources) and, (2) the user's completed courses in an education database EDU indicate that he or she has passed a sensitivity training class. Of course, this is just a representative policy for descriptive purposes. During the query processing, the policy engine queries those attribute sources (which may be local or external) and makes (in this example) the positive determination for this user that he or she meets those qualifications (in other words, that the policy rule evaluates true). As a result, the security policy engine 600 grants the PII label. The data-centric label is then included in the query 608, which is now modified from the original query 602. If the user does not meet this particular policy rule, the query would not include this particular data-centric label.

The security policy engine may implement one or more pluggable policies, and each such policy may include one or more policy rules. The particular manner in which the policy rules are evaluated within a particular policy, and/or the particular order or sequence of evaluating multiple policies may be varied and is not a limitation. Typically, these considerations are based on the enterprise's information security policies. Within a particular rule, there may be a one-to-one or one-to-many correspondence between a user-centric attribute, on the one hand, and a data-centric label, on the other. The particular translation from user-centric realm to data-centric realm provided by the policy rule in a policy will depend on implementation.

Figure 7:
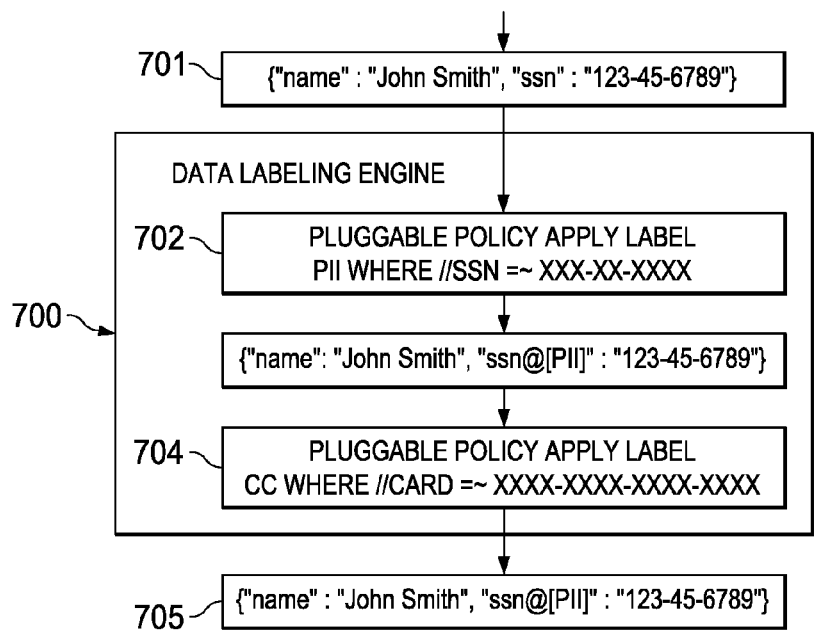
FIG. 7 illustrates how the data labeling engine uses a pluggable policy to label data as it is ingested.

FIG. 6 thus illustrates the implementation of a query-time policy rule (and policy). Pluggable policies preferably are also used during ingest by the data labeling engine (e.g., engine 306, in FIG. 3). This operation is illustrated in FIG. 7, which shows data labeling engine 700 implementing a pair of pluggable policies 702 and 704 as data is ingested. In this example, the data is in the form of a document 701 (e.g., a JSON document), which enters the labeling engine from the top and includes a set of user attributes (name and social security number) and their values. Policies 702 and 704 are in place about how to properly attach the data-centric label(s). In this example scenario, the first policy 702 attaches the label "PII" to any top-level field called "ssn" whose contents match the pattern of a social security number. The second policy 704 attaches the label "CC" to any top-level field called "card" that matches the pattern of a credit card number. In this example, and given the JSON input, the first policy matches and adds its label, but the second policy does not match (thus leaving the document unmodified with respect to this particular data-centric label). The resulting data is output at 705 and includes the data-centric label as indicated. Thus, in general, the data labeling engine takes data in, applies one or more ingest-time policies, and generates data that may be labeled with one or more data-centric labels.

Figure 8:
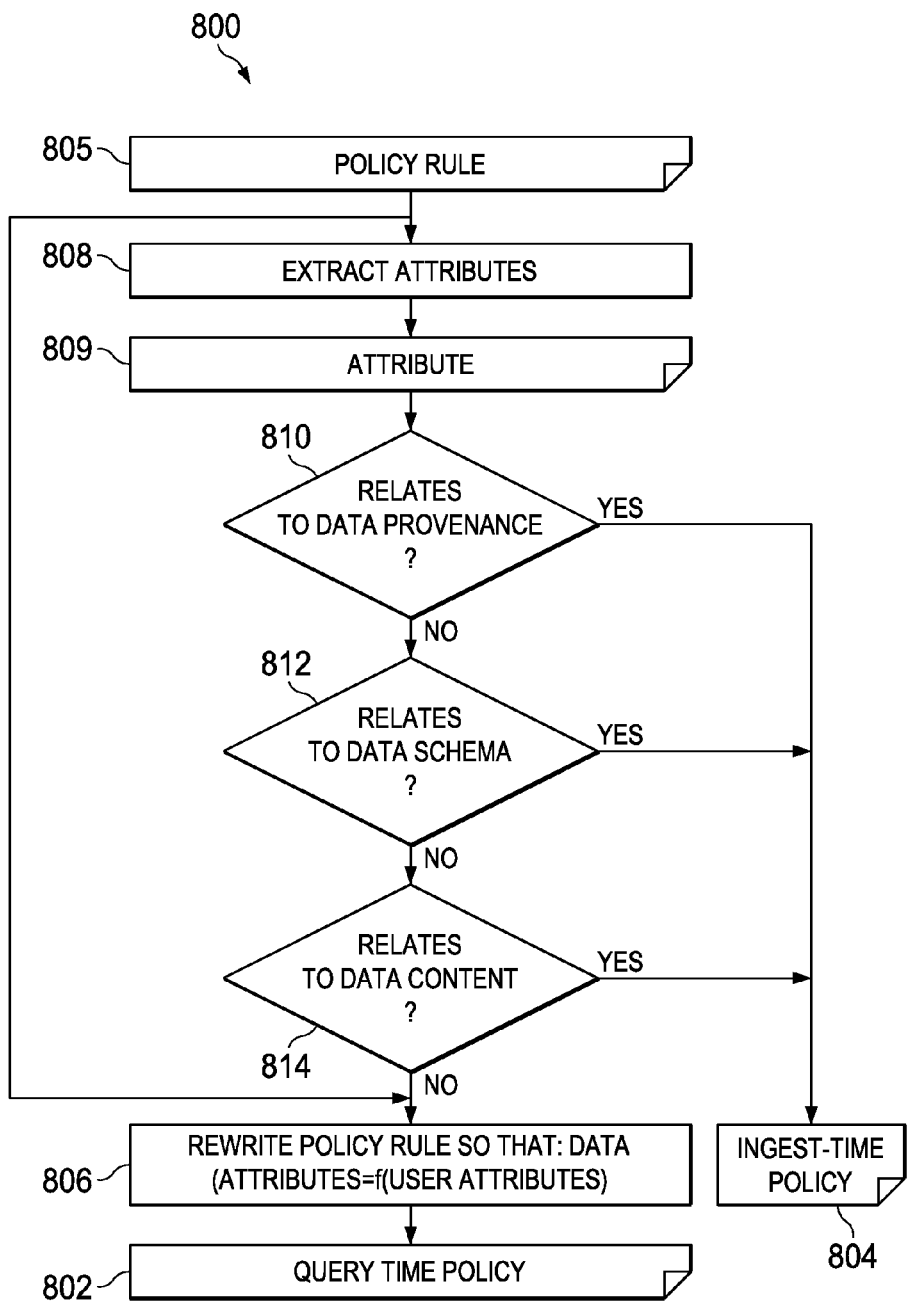
FIG. 8 illustrates a policy rewriting process that takes an enterprise information security policy rule and uses it to generate the query-time policy rule implemented by the query processing engine, and the ingest-time policy rule implemented by the data labeling engine.

FIG. 8 illustrates a policy rewriting process 800 that takes a policy rule as input and generates a query-time policy 802 (for use by the query processing engine) and an ingest-time policy 804 (for use by the data labeling engine). To this end, the policy rewriting process 800 takes the policy rule 805 (or, more generally, the enterprise policy) and rewrites it as two separate policies 802 and 804. Policy 802 is the query-time policy that is applied (for example) in FIG. 6, and policy 804 is the ingest-time policy that is applied (for example) in FIG. 7. As shown in FIG. 8, the policy rule is processed at step 808 to extract its attributes. For each particular attribute 809, a series of classification steps are performed to classify the attribute as a data-centric attribute or a user-centric attribute. Steps 810, 812, and 814 are characteristic of this classification process. Step 810 tests whether the attribute is directly descriptive of data provenance. If not, a test is performed at step 812 to determine whether the attribute relates to a data schema. If not, a test is performed at step 814 to determine whether the attribute relates to data content. If the outcome of any of the tests at step 808, 810 and 812 are positive, one or more rules are generated to apply this attribute to data at ingest time as part of the data labeling policy depicted in 702 and 704. Preferably, the attribute classification from steps 808, 810, and 812 is combined with the original policy 805 by a rewriting function 806 to generate the query-time policy 802. The rewriting function 806 typically associates a data-centric label (or a set of such labels) with a function that takes one or more user-centric attributes as arguments. The rewriting function 806, for example, generates the GRANT "PII" rule shown in FIG. 6 using the identified function.

The query-time policy and the ingest-time policy typically include different user-centric attribute(s) to data-centric label associations.

Different policy rules may be used to generate each of the query-time and ingest-time policies.

Query-time policies may be obtained from a configured set of such policies.

Ingest-time policies may be obtained from a configured set of such policies.

The system preferably includes one or more pluggable policies in each of the data labeling engine and the security policy engine, although this is not a requirement.

The word "pluggable" is not intended to be limiting and may extend to fixed or static policies that are hard-coded into the engine, or policies that are generated dynamically or based on other criteria.

The individual "engines" identified in the figures need not be standalone module or code components; these functions may be integrated in whole or in part.

The key-value transform and indexing engine interprets hierarchical document labels and propagates those labels through a document hierarchy. That operation is described in Ser. No. 61/832,454, filed Jun. 7, 2013, and assigned to the assignee of this application. That disclosure is incorporated herein by reference. The transform and indexing engine interprets fields in hierarchical documents as field name and visibility/authorization label. In JSON, these two elements may be parsed out of a single string representing the field. The visibility/authorization label detected is translated into the protection mechanism supported by the database using a simple data model. The engine preserves the labels through the field hierarchy, such that a field is releasable for a given query only when all of its labeled ancestors are releasable. It transforms hierarchical documents into indexed forms, such as forward indices and numerical range indexes, such that the index is represented in the database using the data model, and the information contained in any given field is protected in the index of the database at the same level as the field.

The above-described technique provides many advantages. The approach takes Accumulo's native cell-level security capabilities and integrates with commonly-used identity credentialing and access management systems, such as Active Directory and LDAP. The enterprise-based architecture described is useful to securely integrate vast amounts of multi-structured data (e.g., tens of petabytes) onto a single Big Data platform onto which real-time discovery/search and predictive analytic applications may then be built. The security framework described herein provides an organization with entirely new Big Data capabilities including secure information sharing and multi-tenancy. Using the described approach, an organization can integrate disparate data sets and user communities within a single data store, while being assured that only authorized users can access appropriate data. This feature set allows for improved sharing of information within and across organizations.

The above-described architecture may be applied in many different types of use cases. General (non-industry specific) use cases include making Hadoop real-time, and supporting interactive Big Data applications. Other types of real-time applications that may use this architecture include, without limitation, cybersecurity applications, healthcare applications, smart grid applications, and many others.

The approach herein is not limited to use with Accumulo; the security extensions (role-based and attribute-based access controls derived from information policy) may be integrated with other NoSQL database platforms. NoSQL databases store information that is keyed, potentially hierarchically. The techniques herein are useful with any NoSQL databases that also store labels with the data and provide access controls that check those labels.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with any application layer protocols, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

The platform functionality may be co-located or various parts/components may be separately and run as distinct functions, in one or more locations (over a distributed network).

What is claimed is as follows:

1. A method executable on one or more computing machines and operative in association with a sorted, distributed key-value data store, comprising:

processing an enterprise information security policy to generate an ingest-time policy, and a query-time policy, at least one of the ingest-time policy and the query-time policy being pluggable, wherein according to the query-time policy at least one policy rule is applied to one or more user-centric attributes associated with a user-centric realm to generate at least one data-centric attribute associated with a data-centric realm;

as data is ingested into the data store at an ingest time, tagging one or more key-value pairs in the data with a data-centric label as determined by the ingest-time policy to generate tagged data, the data-centric label representing a function evaluated over a set of variables;

storing the tagged data in the data store;

at query time, the query time being distinct from and occurring after the ingest time, and in response to receipt of a query from a querier, modifying the query according to at least the query-time policy to include the at least one data-centric attribute, the data-centric attribute being distinct from the data-centric label; and processing the query that has been modified to include the at least one data-centric attribute by forwarding to the data store the query that has been modified, receiving a response, and returning a response to the querier;

wherein the processing is executable by a hardware processor.

2. The method as described in claim 1 wherein the response is generated in the data store upon evaluating the at least one data-centric attribute in the query that has been modified with at least one data-centric label in the data store, the data-centric label in the data store having been associated with the data during the tagging at ingest time.

3. The method as described in claim 1 wherein the at least one data-centric attribute is determined by evaluating values of one or more user-centric attributes associated with the querier against at least one policy rule in the query-time policy.

4. The method as described in claim 3 wherein the values of the one or more user-centric attributes are retrieved from one or more user-attribute data sources as defined in a policy rule of the enterprise information security policy.

5. The method as described in claim 1 wherein the data-centric label in the tagged data comprises at least one immutable data element.

6. The method as described in claim 1 wherein the data-centric label is a visibility label.

7. The method as described in claim 6 wherein the visibility label encodes a Boolean expression of one or more data-centric labels.

8. The method as described in claim 1 wherein the data store is a NoSQL database.

9. The method as described in claim 1 wherein the data comprises one of: structured data, semi-structured data, unstructured data, and combinations thereof.

* * * * *